(12) United States Patent
Morita et al.

(10) Patent No.: US 8,011,209 B2
(45) Date of Patent: Sep. 6, 2011

(54) METHOD OF MAKING GLASS

(75) Inventors: Keisei Morita, Yokohama (JP); Sumio Hoshino, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1020 days.

(21) Appl. No.: 11/587,357

(22) PCT Filed: Nov. 18, 2005

(86) PCT No.: PCT/JP2005/021220
§ 371 (c)(1),
(2), (4) Date: Oct. 24, 2006

(87) PCT Pub. No.: WO2006/054685
PCT Pub. Date: May 26, 2006

(65) Prior Publication Data
US 2008/0028798 A1  Feb. 7, 2008

(30) Foreign Application Priority Data

Nov. 19, 2004 (JP) ................................. 2004-335334

(51) Int. Cl.
*C03B 37/075* (2006.01)
(52) U.S. Cl. ................. 65/399; 65/397; 65/377; 65/427
(58) Field of Classification Search ............. 65/379, 65/397, 399
See application file for complete search history.

(56) References Cited

U.S. PATENT DOCUMENTS

| | | | |
|---|---|---|---|
| 5,022,904 A | 6/1991 | Ishiguro et al. | |
| 5,145,507 A * | 9/1992 | Kyoto et al. | 65/398 |
| 6,263,706 B1 * | 7/2001 | Deliso et al. | 65/397 |
| 6,715,322 B2 * | 4/2004 | De Hazan et al. | 65/397 |
| 6,802,191 B2 * | 10/2004 | Hazan et al. | 65/397 |
| 2001/0043782 A1 | 11/2001 | Yokoyama et al. | |
| 2004/0000171 A1 * | 1/2004 | De Hazan et al. | 65/397 |

(Continued)

FOREIGN PATENT DOCUMENTS

EP    1 251 107 A1    10/2002

(Continued)

OTHER PUBLICATIONS

Search Report issued in corresponding International Application No. PCT/JP2005/021220.

*Primary Examiner* — Jason L. Lazorcik
(74) *Attorney, Agent, or Firm* — McDermott Will & Emery LLP (57) ABSTRACT

A method of making a glass is provided in which the time needed for doping a refractive index control substance such as fluorine into a soot glass deposit body can be reduced. The method comprises the steps of: (1) putting a soot glass deposit body in a container; (2) doping a refractive index control substance into the soot glass deposit body by supplying an doping gas into the container, the doping gas containing the substance; and (3) consolidating the soot glass deposit body by heating, wherein the final set-value concentration of the substance is determined beforehand depending on the target refractive index of the glass, and in step (2), the container is supplied with the doping gas including the substance having a concentration set to be higher than the final set-value concentration, and subsequently, the doping gas including the substance having the final set-value concentration is supplied into the container.

4 Claims, 8 Drawing Sheets

U.S. PATENT DOCUMENTS

2004/0172980 A1 * 9/2004 Hazan et al. .................. 65/397

FOREIGN PATENT DOCUMENTS

| | | | |
|---|---|---|---|
| JP | 62-230638 A | 10/1987 | |
| JP | 63-156031 A | 6/1988 | |
| JP | 1-286932 A | 11/1989 | |
| JP | 9-48630 A | 2/1997 | |
| JP | 10-206654 A | 8/1998 | |
| JP | 2003-2680 A | 1/2003 | |

* cited by examiner

METHOD OF MAKING GLASS

RELATED APPLICATIONS

This application is the U.S. National Phase under 35 U.S.C. §371 of International Application No. PCT/JP2005/021220, filed on Nov. 18, 2005, which in turn claims the benefit of Japanese Application No. 2004-335334, filed on Nov. 19, 2004, the disclosures of which Applications are incorporated by reference herein.

TECHNICAL FIELD

The present invention relates to a method of making glass.

BACKGROUND ART

Japanese Patent Application Laid-Open No. H9-48630 discloses a method of manufacturing fluorine doped glass. In this method, a soot glass deposit body is put in a container, and fluorine compound gas is supplied into a container while heating the inside of the container so that fluorine is added to the soot glass deposit body. And, subsequently, the soot glass deposit body is consolidated into transparent glass. While fluorine is added to the soot glass deposit body, the concentration of fluoric raw material in the container is controlled to be 4% by volume. Japanese Patent Application Laid-Open No. S62-230638 discloses a method in which, when a fine glass particles deposited body is subjected to a heat treatment in an atmosphere which includes a fluorine compound, the partial pressure of the fluorine compound is changed. In this method, the partial pressure of the fluorine compound is changed according to the variation of the temperature.

In the methods disclosed in these documents, most of the fluorine compounds are exhausted, simply passing through the container. Therefore, the ratio (yield) of the amount of the fluorine added to the soot glass deposit body relative to the amount of the fluorine supplied into the container is very small, which has resulted in the waste of most of the expensive fluorine compounds.

Patent document 1: Japanese Patent Application Laid-Open No. H9-48630
Patent document 1: Japanese Patent Application Laid-Open No. S62-230638

DISCLOSURE OF INVENTION

Problems to be Solved by the Invention

An object of the present invention is to reduce the time which is needed for doping a refractive index control substance such as fluorine into a soot glass deposit body.

Means for Solving the Problem

The present invention relates to a method of making a glass, which method comprises the steps of (1) putting a soot glass deposit body in a container, (2) doping a refractive index control substance into the soot glass deposit body by supplying an doping gas, which contains refractive index control substance, to the container and discharging the gas from the container, and (3) consolidating the soot glass deposit body by heating. In the present invention, the final set-value concentration of the refractive index control substance is determined beforehand depending on the target refractive index of the glass, and in the process of doping the refractive index control substance, the container is supplied with the doping gas which includes the refractive index control substance having a concentration set to be higher than the final set-value concentration. And, subsequently, the doping gas which includes the refractive index control substance having the final set-value concentration is supplied into the container such that the refractive index control substance is doped into the soot glass deposit body.

In this case, it is effective to flow the refractive index control substance gas at a flow rate f which satisfies $f/V \leq 0.012$ (minute$^{-1}$), where f (standard liter/minute (abbreviated to "slm"): flow rate under the standard conditions (0° C., 1 atm)) is a flow rate of the refractive index control substance gas, and V (liter) is a volume which is obtained by subtracting the volume of the effective portion of the soot glass deposit body from the capacity of the container corresponding to the part which surrounds the effective portion of the soot glass deposit body. Hereinafter, the volume of gas is all expressed as a volume under the standard conditions.

In the process of doping the refractive index control substance, it is preferable to supply into the container an doping gas which includes the refractive index control substance having the set-value concentration lower than the final set-value concentration or a gas which does not include the refractive index control substance after the supply of the doping gas which includes the refractive index control substance having the set-value concentration higher than the final set-value concentration into the container and prior to the supply of the doping gas which includes the refractive index control substance having the final set-value concentration, because the soot glass deposit body can be doped with the refractive index control substance uniformly and in a short time even if it has a large diameter.

Advantage of the Invention

According to the present invention, the time needed for doping a refractive index control substance to the soot glass deposit body can be reduced. Particularly, the present invention is effective when the flow rate of the refractive index control substance is decreased. Also, in the process of doping the refractive index control substance, it is made possible to dope the refractive index control substance into the soot glass deposit body having a large diameter uniformly and in a short time by supplying into the container an doping gas which includes the refractive index control substance having the set-value concentration lower than the final set-value concentration or a gas which does not include the refractive index control substance.

BEST MODE FOR CARRYING OUT THE INVENTION

Embodiments of the present invention are described hereinafter in reference to the drawings. The drawings are for the purpose of explanation, and not intended to limit the scope of the invention. To avoid overlapping explanations about the drawings, the same references indicate the same parts. The dimensional ratio in the drawing is not always exact.

Figure 1:
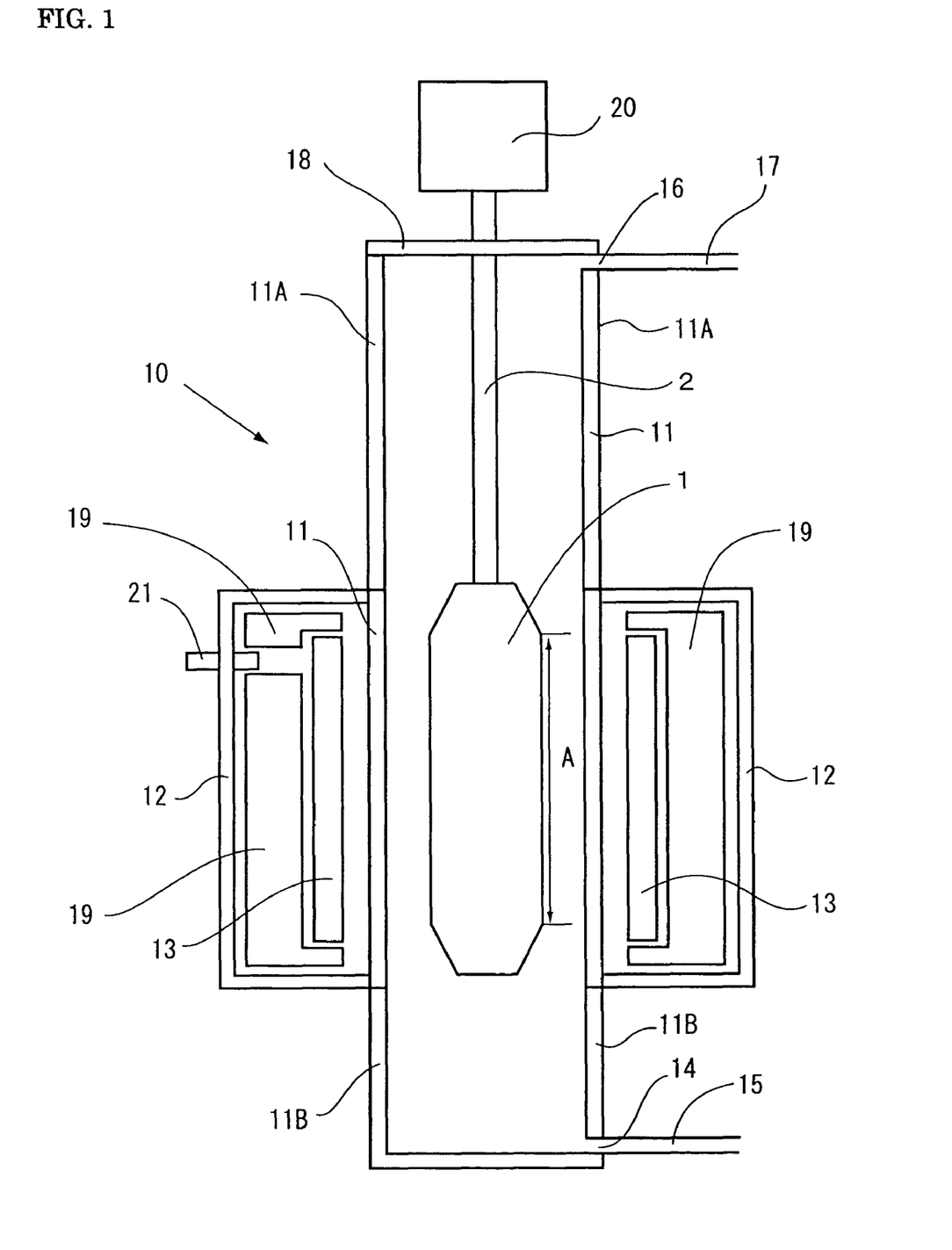
[FIG. 1] A figure for explaining a mechanism of doping a refractive index control substance to a soot glass deposit body according to the present invention.

Referring to FIG. 1, an explanation will be given about a first embodiment of the present invention according to which a refractive index control substance is added to a soot glass deposit body. A heating unit 10 is equipped, at the central position thereof, with a container, which is composed of a furnace muffle tube 11, an upper extension part 11A, and a lower extension part 11B, and a heat source 13 is disposed outside the furnace muffle tube 11. The heat source 13 is covered with an outer wall 12. A thermal insulation material 19 is placed between the heat source 13 and the outer wall 12. A notch is provided at a part of the outer wall 12, and a radiation thermometer 21 is installed therein. No thermal insulation material is provided between the radiation thermometer 21 and the heat source 13. A supply inlet 14 is provided at the lower part of the lower extension part 11B which is connected to the furnace muffle tube 11. A supply pipe 15 is attached to the supply inlet 14. A discharge outlet 16 is provided at the upper part of the upper extension part 11A which is connected to the furnace muffle tube 11, and a discharge pipe 17 is attached thereto.

A soot glass deposit body 1 is put into the container by suspending it with a lift 20 through a dummy rod 2, and a lid 18 is closed. The dummy rod 2 pierces through the lid 18, sealing is provided without any gap between the dummy rod 2 and the lid 18. By driving the lift 20, the soot glass deposit body 1 is caused to descend to the position which is surrounded by the heat source 13. And, the lift 20 is stopped at the position where a regular outer diameter part A of the soot glass deposit body 1 is surrounded by the heat source 13, and the position of the soot glass deposit body 1 is fixed.

The soot glass deposit body 1 is dehydrated by heating, raising the temperature of the heat source 13 to about 1000° C. to 1300° C. while a gas including a dehydration gas of chlorine, silicon tetrachloride, etc. is supplied from the supply inlet 14 into the container through the supply pipe 15. The moisture in the furnace is sucked together with the gas in the furnace from the discharge outlet 16 and discharged. The heat source 13 may be a resistance heating-type heater or an induction heating-type heater. When those heaters are used, the voltage and the electric current applied to the heat source 13 are controlled by measuring the temperature of the heat source 13 with the radiation thermometer 21 so that the pre-determined temperature may be obtained.

When the temperature of the heat source 13 increases to about 1000° C. to 1300° C., the supply of the dehydration gas is stopped and the heat source 13 is maintained at the temperature. Then, a doping gas which includes a refractive index control substance is supplied into the container from the supply inlet 14. Subsequently, the gas in the container is sucked from the discharge outlet 16 and discharged. The discharge amount may appropriately be changed depending on the flow rate of the supplied gas which includes a refractive index control substance. By supplying the doping gas from a lower part of the container and discharging the supplied gas from an upper part of the container, the gas supplied from the supply inlet 14 is caused to flow above, and an air current is formed in the container so as to flow to the discharge outlet 16 from the supply inlet 14. The refractive index control substance can be doped into the soot glass deposit body by applying the refractive index control substance into the container while heating is performed for several tens of minutes to several hours.

Figure 2:
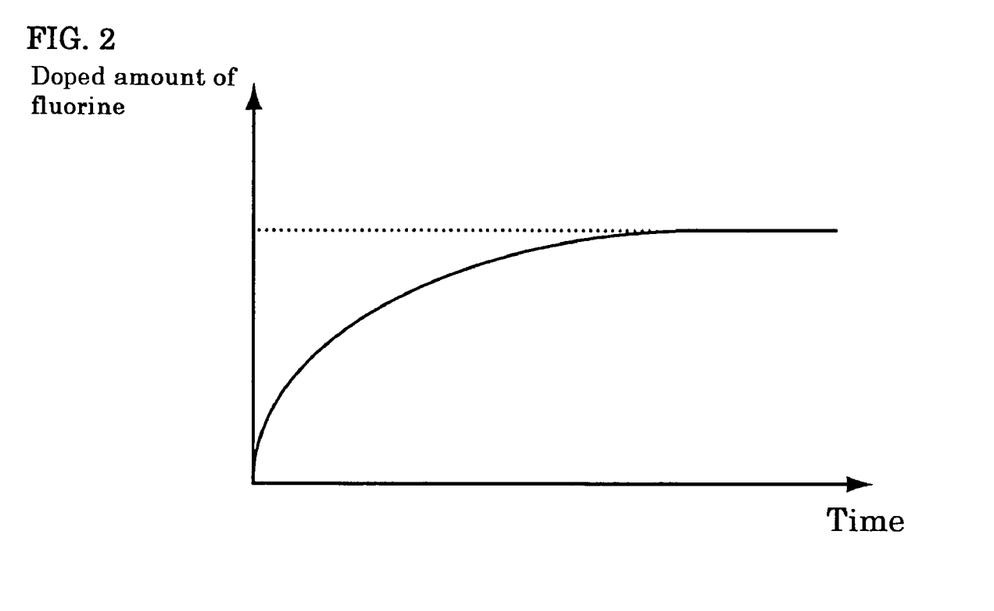
[FIG. 2] A figure showing the relationship between the fluorine doping time and the doped amount of fluorine.

FIG. 2 shows a relationship between the doping time of fluorine and the amount of the fluorine doped into the soot glass deposit body in a conventional method in which a soot glass deposit body is doped with fluorine by supplying a $SiF_4$ gas at a constant concentration to a container in which the soot glass deposit body is placed. Here, the term "doping time" means the time which has elapsed from the start of supplying $SiF_4$ gas into the container. The amount of the fluorine added increases as the doping time becomes long and reaches a saturated state. The saturation of added amount depends on the fluoric concentration around the soot glass deposit body when the saturation has occurred. Thus, hereinafter, the concentration which brings about such saturation of added amount is referred to as "final set-value concentration".

If the concentration of fluorine supplied to a container is constant, the amount (the inclination of tangent in the graph of FIG. 2) of fluorine doped into the soot glass deposit body in a unit time is large immediately after the start of doping, decreasing with the elapse of time. If the elapse of time from the start of doping is the same, the amount of fluorine doped for a unit time depends on the fluoric concentration, and the higher the concentration, the more the doped amount of fluorine for a unit time.

In the first embodiment of the present invention, at an early stage of the doping process of a refractive index control substance, the set-value concentration of the refractive index control substance is specified at an amount of concentration higher than the pre-determined final set-value concentration, accelerating the doping of the refractive index control substance. Thereafter, the set-value concentration of the refractive index control substance is set to the predetermined final set-value concentration, and the refractive index control substance is doped into the soot glass deposit body until a pre-determined saturation amount (target value). Thus, the refractive index of the glass obtained by heating and consolidating the soot glass deposit body thus prepared becomes the pre-determined value.

Here, according to the present invention, the doping of the refractive index control substance is completed before consolidating the soot glass deposit body. In the present invention, the heating temperature and the treating time are determined such that the increment of the average bulk density of the soot glass deposit body may be maintained equal to or less than $0.2 \text{ g/cm}^3$ while the set-value concentration of the refractive index control substance is set to be higher than the final set-value concentration. By setting the heating temperature and the heating time in a manner such as described above, the refractive index control substance can be doped into the soot glass deposit body promptly and uniformly without decreasing the speed at which the doping gas including the refractive index control substance is diffused into the soot glass deposit body.

Figure 3:
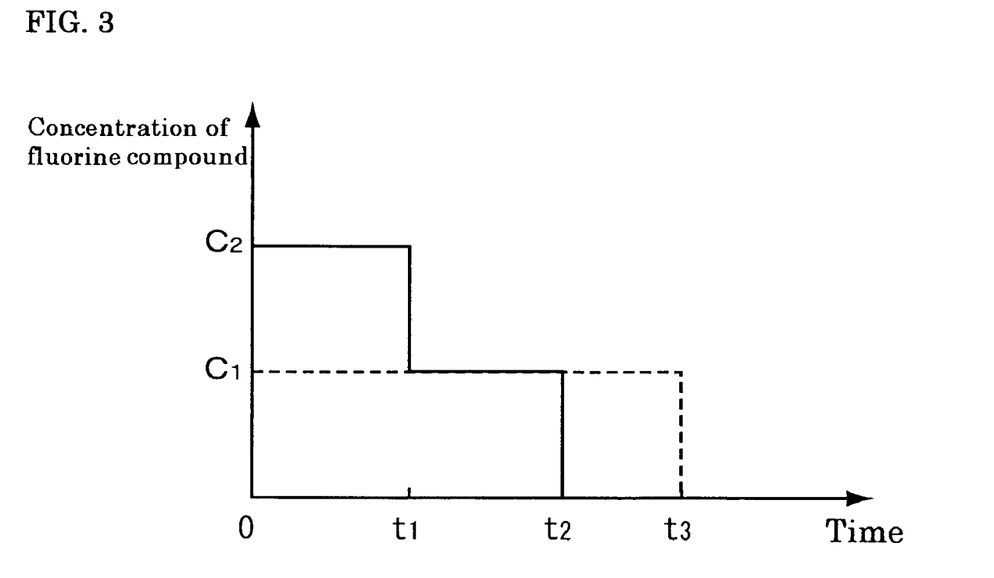
[FIG. 3] A figure showing one embodiment of changes in a set-value concentration of fluorine according to the present invention.
Figure 4:
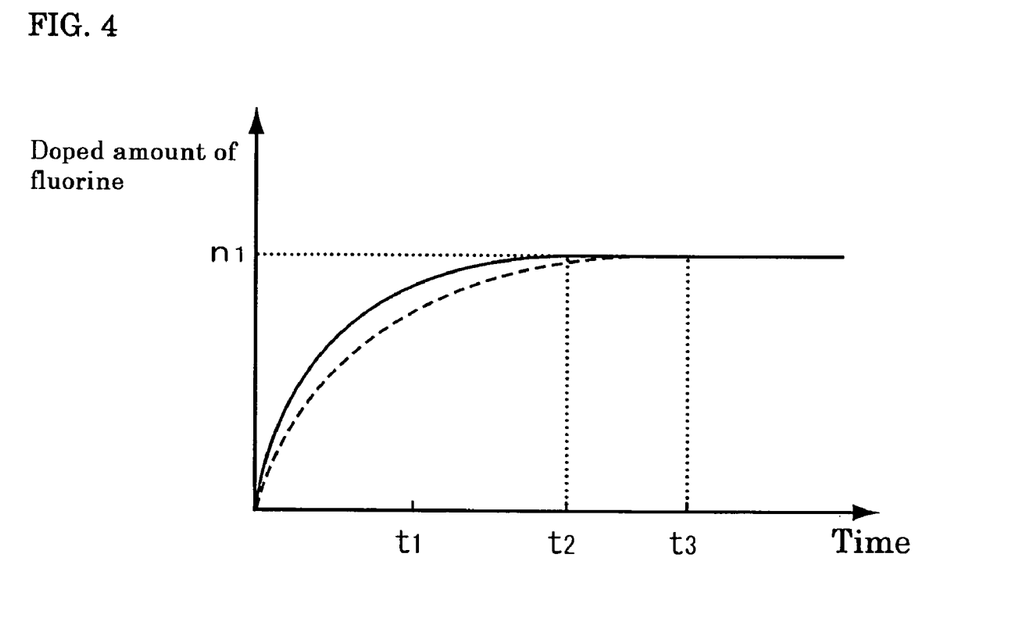
[FIG. 4] A figure for explaining that the fluorine doping time can be reduced by enhancing a set-value concentration of fluorine.

The contrast between the present invention and the conventional technique will be described, using a case of doping fine glass particles with fluorine as an example. The concentration of the fluorine to be doped into the soot glass deposit body is represented by $n_1$, and the final set-value concentration of the fluorine that is needed for doping such amount of the fluorine is represented by $c_1$. The solid line shown in FIG. 3 is a case where the set-value concentration of fluorine is set to be $c_2$ ($>c_1$) during a period from the start of doping the fluorine to time $t_1$, and at the time $t_1$ the set-value concentration of fluorine is set to be $c_1$. In this case, as shown in FIG. 4, the fluorine of the given concentration $n_1$ is doped into the soot glass deposit body at time $t_2$. On the other hand, in the conventional technique which is the case shown by the broken line in FIG. 3 and FIG. 4, the set-value concentration of fluorine from the start of doping the fluorine is $c_1$, and the fluorine having a concentration $n_1$ is doped into the soot glass deposit body at time $t_3$ ($>t_2$).

Figure 5:
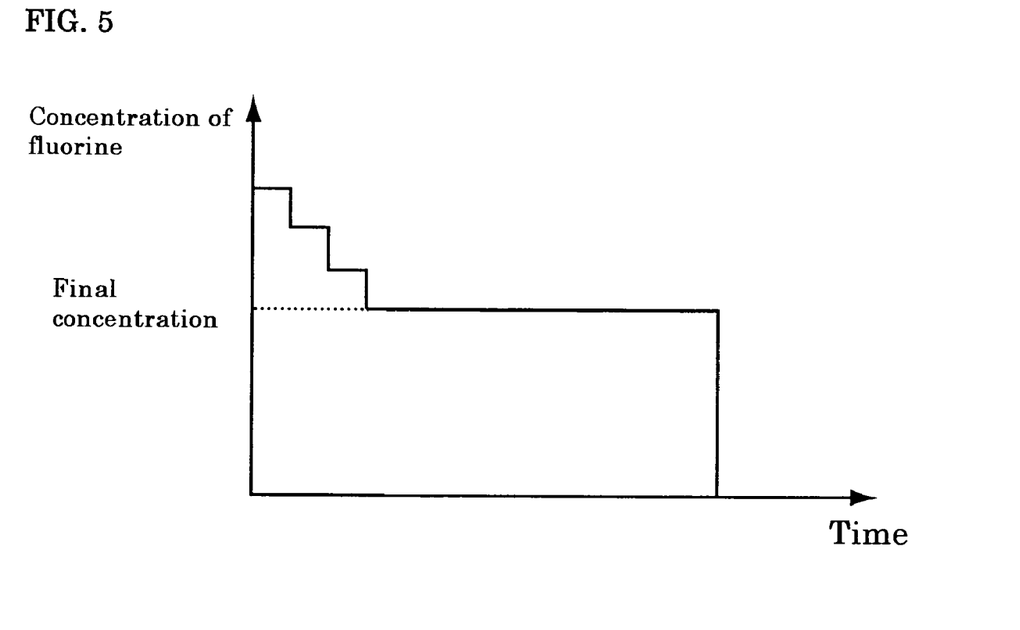
[FIG. 5] A figure showing one embodiment of changes in a set-value concentration of fluorine according to the present invention.
Figure 6:
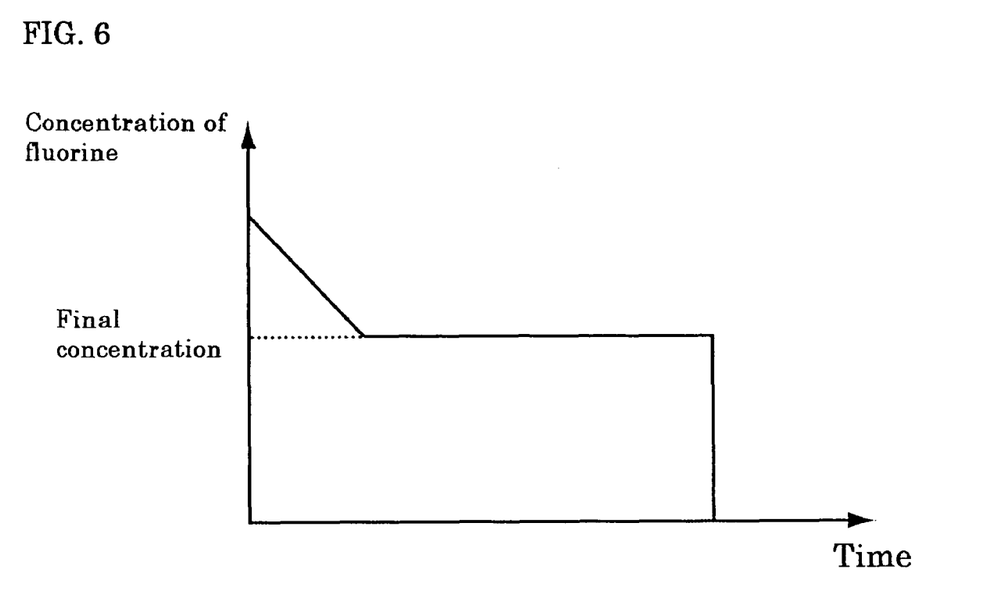
[FIG. 6] A figure showing one embodiment of changes in a set-value concentration of fluorine according to the present invention.
Figure 7:
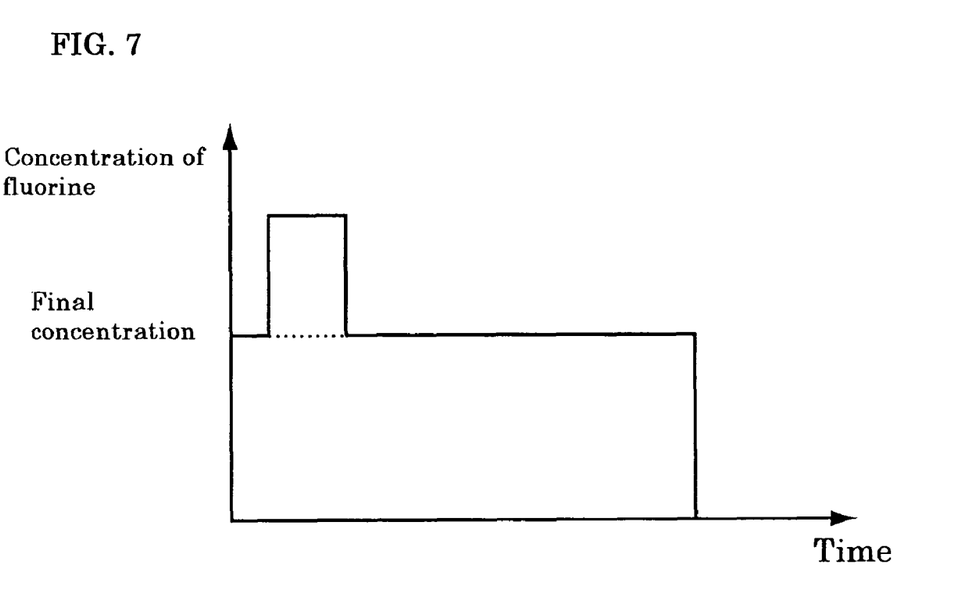
[FIG. 7] A figure showing one embodiment of changes in a set-value concentration of fluorine according to the present invention.

The set-value concentration of the refractive index control substance according to the present invention may be altered stepwise as shown in FIG. 5, or may be changed continuously as shown in FIG. 6, or the set-value concentration of the refractive index control substance may be increased, as shown in FIG. 7, in a short time after the beginning of the doping of the refractive index control substance. However, since the doped amount of the refractive index control substance in a unit time is larger immediately after the start of doping, it is effective for decreasing the doping time that the set-value concentration of the refractive index control substance be set to be higher than the final set-value concentration at such time.

The soot glass deposit body to be used in the present invention can be made by the VAD or OVD method, in which $SiCl_4$ and $GeCl_4$ as glass raw materials are flowed in an oxyhydrogen flame, generating fine glass particles of $SiO_2$ and $GeO_2$ by flame hydrolysis reaction, and the fine glass particles are deposited on a starting rod. The refractive index control substance to be used in the present invention is mainly a halogen-based element. The doping gases which include a refractive index control substance are, for example, $SiF_4$, $SF_6$, $GeCl_4$, $CF_4$, $C_2F_6$, $CCl_2F_2$, $Cl_2$, and $SiCl_4$, etc. The doping gas may be a gas in which those gases are diluted with an inert gas such as a He gas, or a low reactive gas such as a nitrogen gas. The refractive index control substance can co-exist as a gas, intermingling with the doping gas.

In the space surrounded by the furnace muffle tube 11, a supplied refractive index control substance enters into the gaps among the fine particles of the soot glass deposit body and diffuses into the whole of the soot glass deposit body so as to be combined with any of silicon atoms of the fine glass particles and doped into the soot glass deposit body 1. Accordingly, the refractive index control substance is doped into the soot glass deposit body 1 from the side which is near the supply inlet 14. Therefore, the concentration of the refractive index control substance is high at a position near the supply inlet 14 in the space around the soot glass deposit body 1 in the container, becoming lower as the position is distanced away from the supply inlet 14 (i.e., as the position is located closer to the discharge outlet 16). In other words, in the space in the container, the concentration inclination occurs along the longitudinal direction of the soot glass deposit body 1.

When the flow rate per unit time of the refractive index control substance gas is small relative to the container capacity corresponding to the space surrounding the soot glass deposit body, as compared with the case where it is large, the concentration becomes relatively low around the soot glass deposit body at the side near the discharge outlet. Therefore, on the side which is near the discharge outlet of the soot glass deposit body, it takes a long time for the refractive index control substance to reach saturation. In the present invention, the doping into the soot glass deposit body of the refractive index control substance is accelerated by supplying the refractive index control substance into the container at the set-value concentration which is higher than the predetermined final set-value concentration before the amount of the refractive index control substance doped into the soot glass deposit body reaches saturation. The effect of thus reducing the doping time is large when the flow rate of the gas which includes a refractive index control substance is small relative to the container capacity surrounding the soot glass deposit body.

It was found that the effect of the present invention is large especially when the f/V value available immediately before the end of doping is 0.012 (minute$^{-1}$) or less, where the flow rate of the refractive index control substance gas is f (slm), and the amount obtained by subtracting the volume of the effective portion of the soot glass deposit body from the capacity of the container corresponding to the part which surrounds the effective portion of the soot glass deposit body is V (liter). Here, the term "the volume obtained by subtracting the volume of the effective portion of the soot glass deposit body from the capacity of the container corresponding to the part which surrounds the effective portion of the soot glass deposit body" is a volume of a space at a portion surrounding the soot glass deposit body inside the container and is a value which is obtained by integrating the cross-sectional area of the clearance between the container and the soot glass deposit body over the effective length of the soot glass deposit body. For example, $V=\pi(R^2-r^2)L$, where the length of the effective portion A of the soot glass deposit body is L, the furnace muffle tube 11 in FIG. 1 is a cylinder having a constant inner diameter of 2R, and the effective portion of the soot glass deposit body is a column having a constant radius r.

After doping the refractive index control substance, an inert gas such as He gas or a gas, such as a nitrogen gas, having almost no reactivity is supplied into the container from the supply inlet 14 through the supply pipe 15, the temperature of the heat source is raised to about 1500° C., and the soot glass deposit body is heated for several tens of minutes or several hours at such a temperature, thereby consolidation is accomplished to produce a transparent glass. In the consolidation process of the soot glass deposit body, the refractive index control substance existing in the outer periphery of the soot glass deposit body may occasionally come out. In the present invention, the doping of the refractive index control substance is completed before the soot glass deposit body is consolidated. However, in order to prevent the refractive index control substance from coming out of the soot glass deposit body, the atmosphere around the soot glass deposit body may be maintained to contain the refractive index control substance after the completion of doping. The present invention is effective especially in the case in which the effective portion of the soot glass deposit body is shorter than the length of the heat source as shown in FIG. 1 and the soot glass deposit body is not moved in the longitudinal direction relative to the heat source when the soot glass deposit body is doped with the refractive index control substance.

EXAMPLES

Example 1

A soot glass deposit body having an outer diameter of 150 mm and a length of 1200 mm was manufactured by the VAD method. This soot glass deposit body was placed in the furnace muffle tube having an inner diameter of 200 mm. The volume V (liter), which is a volume obtained by subtracting the volume of the effective portion of the soot glass deposit body from the volume of the capacity of the furnace muffle tube corresponding the part that surrounds the effective portion of the soot glass deposit body is 16.5 (liter).

First, the soot glass deposit body was heated to a temperature of 1250° C. so as to perform dehydration while $Cl_2$ gas and He gas were flowed. Upon stopping the supply of $Cl_2$ gas, immediately a $SiF_4$ gas and He gas were flowed at the flow rates of 1.2 (slm) and 9.0 (slm), respectively, and the discharge amount from the discharge outlet was set to be 10.2 (slm). The temperature of the heat source was maintained at 1250° C., and after the elapse of 0.6 hours, the flow rate of the $SiF_4$ gas was altered to 0.6 (slm). The flow rate of the He gas was kept as it was. The discharge amount was changed to 9.6 (slm). Furthermore, after the elapse of 1.2 hours (i.e., 1.8 hours after the start of flowing the $SiF_4$ gas), the supply of $SiF_4$ gas was stopped. Where the flow rate of the $SiF_4$ gas, which is the refractive index control substance gas, is f (slm), f/V (minute$^{-1}$) is 0.073 (minute$^{-1}$) at first, and is 0.036 (minute$^{-1}$) from the midway.

After stopping the supply of the $SiF_4$ gas, the He gas was flowed continuously at the same flow rate, and the discharge amount was altered to 9.0 (slm). Thereafter, the temperature of the heat source was raised to 1450° C., and heating was continued for 2 hours at such temperature, and consequently, a transparent glass was produced. When the refractive index of the glass was measured at six measurement points, changing the measurement position longitudinally, the relative refractive index difference relative to pure silica glass was −0.35%±0.01%.

Comparative Example 1

A soot glass deposit body having the same size as in Example 1 was subjected to dehydration in the same heating unit, and was doped with fluorine and consolidated so as to manufacture a transparent glass. As for the flow rates of the gas when fluorine was doped, the $SiF_4$ gas was 0.6 (slm), the He gas was 9.0 (slm), and the discharge amount was 9.6 (slm), respectively kept at a constant flow rate. The dehydration before doping fluorine and the consolidation after doping of fluorine were performed in the same manner as in Example 1. The time needed for doping fluorine in order to manufacture the glass that is equal to that of Example 1 (the relative refractive index difference after consolidation is −0.35%±0.01%) was 3 hours.

In Example 1, the time necessary for doping fluorine could be reduced by 1.2 hours as compared with Comparative Example 1. Also, the amount of use of $SiF_4$ could be saved: 86.4 liters in Example 1, while 108 liters in Comparative Example 1, thus in Example 1, the yield of the $SiF_4$ gas was improved.

Example 2

The following Example 2 and Comparative Example 2 are the cases where the flow rates of the gas which includes the refractive index control substance were decreased as compared to Example 1 and Comparative Example 1. A soot glass deposit body having the same size as in Example 1 was subjected to dehydration in the same heating unit, doped with fluorine and consolidated, thereby a transparent glass was manufactured. The flow rates of the $SiF_4$ gas and the He gas during the doping of fluorine were at first 0.2 (slm) and 1.5 (slm), respectively, and the discharge amount from the discharge outlet was 1.7 (slm). The temperature of the heat source was maintained at 1250° C., and upon the elapse of 1.5 hours, the flow rate of the $SiF_4$ gas was altered to 0.1 (slm). The flow rate of the He gas was kept as it was. The discharge amount was changed to 1.6 (slm). Furthermore, upon the elapse of 3.5 hours (i.e., upon elapse of 5 hours after the start of flowing the $SiF_4$ gas), the supply of the $SiF_4$ gas was stopped. At first, f/V (minute$^{-1}$) is 0.012 (minute$^{-1}$), being changed to 0.006 (minute$^{-1}$) from the midway.

After the supply of the $SiF_4$ gas was stopped, the He gas was continuously flowed at the same flow rate, and, the discharge amount was changed to 1.5 (slm). Thereafter, the temperature of the heat source was raised to 1450° C., and continued heating for 2 hours at such temperature and thereby a transparent glass was obtained. When the refractive index of the glass thus obtained was measured at six measurement points in the same manner as in Example 1, the relative refractive index difference relative to pure silica glass was −0.35%±0.01%.

Comparative Example 2

A soot glass deposit body having the same size as in Example 1 was subjected to dehydration in the same heating unit, doped with fluorine and consolidated, thereby a transparent glass was manufactured. The flow rates of the $SiF_4$ gas and the He gas during the doping of fluorine were 0.1 (slm) and 1.5 (slm), respectively, and the discharge amount from the discharge outlet was 1.6 (slm), respectively kept in constant. The dehydration before doping of fluorine and the consolidation after the doping of fluorine were performed in the same manner as in Example 2. The time needed for doping fluorine in order to manufacture the glass having the relative refractive index difference after vitrification of −0.35%±0.01% that is equal to that of Example 2 was 9 hours.

In Example 2, the manufacturing time can be reduced by 4 hours as compared to Comparative Example 2, and the amount of use of the $SiF_4$ gas in Example 2 can be saved by 15 liters as compared with Comparative Example 2. Thus, it is confirmed that the invention can be effective even at the reduced flow rate of the gas which includes the refractive index control substance. Particularly, as to the time needed for flowing the gas which includes the refractive index control substance, Example 1 is completed at 60% of the time needed in Comparative Example 1, and Example 2 is accomplished at 56% of the time of Comparative Example 2. Therefore, the time reduction effect is larger in the case where the flow rate of the gas which includes the refractive index control substance is reduced. Also, comparing Example 1 and Example 2, in the case where the flow rate of the gas which includes the refractive index control substance is reduced, the time for flowing the gas becomes longer but the total volume of the flowed gas can be reduced.

In the case where the diameter of the soot glass deposit body is large; for example, the diameter of the soot glass deposit body is equal to or more than 200 mm, the amount of the refractive index control substance which is doped in the outer peripheral part of the soot glass deposit body is larger than that which is doped in the central part if the concentration of the refractive index control substance is high. In other words, the doped amount of the refractive index control substance is not always uniform in the radial direction of the soot glass deposit body. The term "the central part" as used herein means a part that is within a distance of 25 mm or less from the central axis of the soot glass deposit body when the soot glass deposit body has a diameter of 200 mm, and generally a part that is within a distance equal to or less than ¼ of the radius from the central axis. The outer peripheral part is a part that is distanced from the central axis by 75 mm or more in the case of the soot glass deposit body having a diameter of 200 mm, and it is generally a part that is distanced from the central axis by ¾ of the radius or more.

Therefore, in the second embodiment of the present invention, the removal of the excessively doped refractive index control substance from the outer peripheral part of the soot glass deposit body is facilitated by decreasing the concentration of the refractive index control substance in the doping gas to a level lower than the final set-value concentration after the refractive index control substance having a concentration that is higher than the final set-value concentration has been supplied to the container such that the soot glass deposit body has been doped with the refractive index control substance. Thereafter, the set-value concentration of the refractive index control substance is set to be the final set-value concentration, and the refractive index control substance is doped into the soot glass deposit body to the level of the pre-determined saturation amount (the target value). Thus, the soot glass deposit body having a large diameter can be doped with the refractive index control substance uniformly in the radial direction.

Moreover, by making the initial concentration of the refractive index control substance to be higher than the final set-value concentration, it is possible to reduce the doping time of the refractive index control substance, as compared with the case in which the concentration of the refractive index control substance is constant, and the amount of the refractive index control substance which is supplied to the reaction container during the time can be decreased. The glass thus obtained by heating and consolidating the soot glass deposit body has a refractive index that is uniform in the radial direction.

Figure 8:
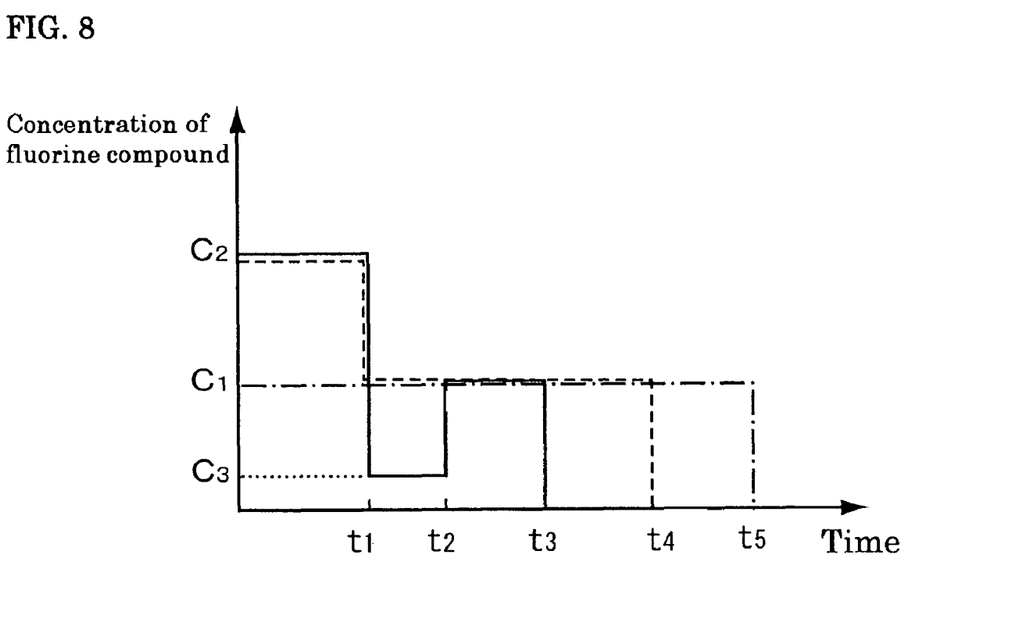
[FIG. 8] A figure showing one embodiment of changes in a set-value concentration of fluorine according to the present invention.

An example in which fluorine is doped into a soot glass deposit body having a large diameter will be explained hereinafter in reference to FIGS. 8 to 10. FIG. 8 shows a temporal change in the concentration of a fluorine compound. The case shown by the solid line is an example of the second embodiment of the present invention: a doping gas (for example, a helium gas which includes $SiF_4$) which includes a fluorine compound gas having a concentration $c_2$ that is higher than the final set-value concentration is supplied into the reaction container from time zero to time $t_1$; a doping gas including a fluorine compound having a concentration $c_3$ that is lower than the final set-value concentration is supplied from time $t_1$ to time $t_2$; and a doping gas containing a fluorine compound having the final set-value concentration $c_1$ is supplied into the reaction container from time $t_2$ to time $t_3$. In this example, the concentration that is lower than the final set-value concentration includes a concentration of zero. In the case of zero concentration, the gas to be supplied to the container is a gas in which the refractive index control substance is excluded from the doping gas that has been supplied to the container.

The case shown by the broken line is an example of the first embodiment of the present invention, in which from time zero to time $t_1$ a doping gas including a fluorine compound gas having a concentration $c_2$ that is higher than the final set-value concentration $c_1$ is supplied to the container, and from time $t_1$ to time $t_4$, a fluorine compound gas having the final set-value concentration $c_1$ is supplied into the container. The case shown by the dot-slash line in FIG. 8 is a conventional example, in which from time zero to time $t_5$ a refractive index control substance having a constant concentration of the final set-value concentration $c_1$ is supplied into the container.

Figure 9:
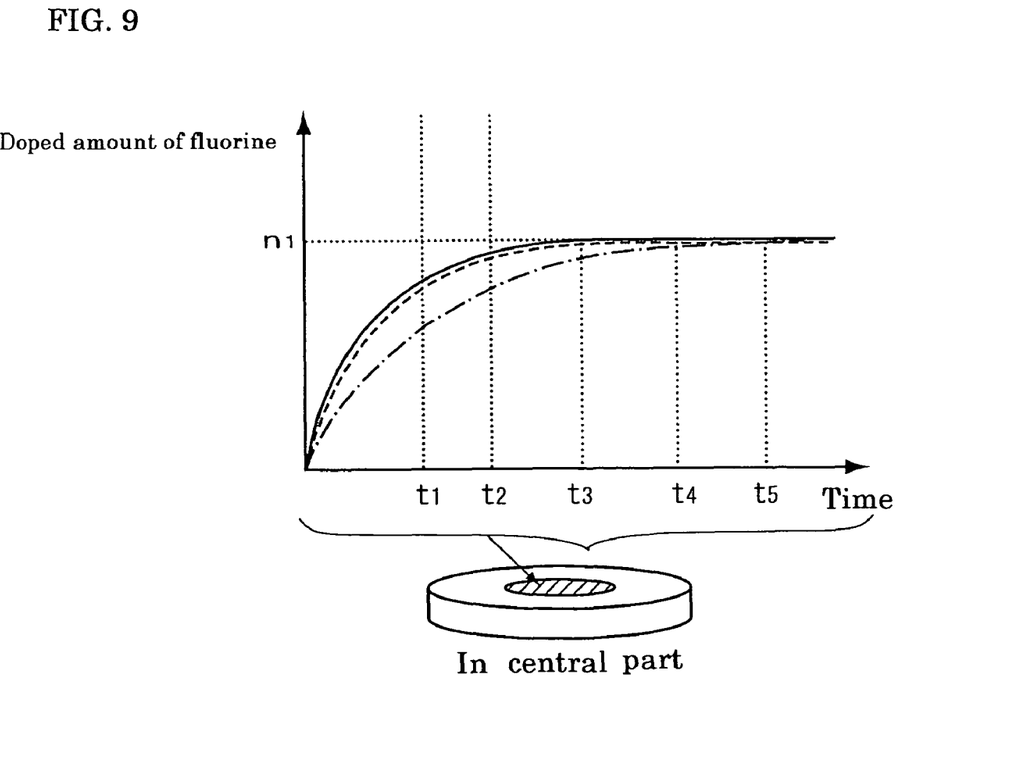
[FIG. 9] A figure showing relationships between the doping time and the doped amount of fluorine in the central part of the soot glass deposit body.
Figure 10:
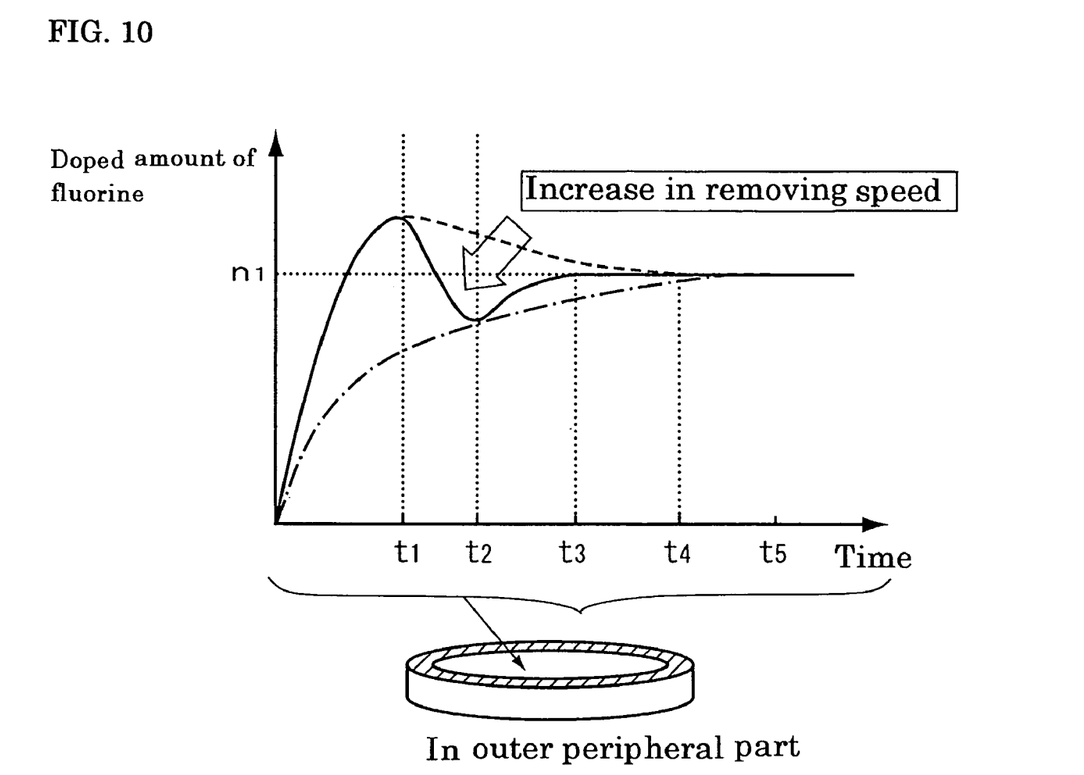
[FIG. 10] A figure showing relationships between the doping time and the doped amount of fluorine in the outer peripheral part of the soot glass deposit body.

FIG. 9 shows relationships between the doping time and the doped amount of fluorine in the central part of the soot glass deposit body, and FIG. 10 shows relationships between the doping time and the doped amount of fluorine in the outer peripheral part of the soot glass deposit body. The solid line, the broken line, and the dot-dash line both in FIG. 9 and FIG. 10 respectively show the doped amounts in the cases where fluoric compound gases are supplied with the concentration variation as in the cases of the solid line, the broken line, and the dot-dash line of FIG. 8.

As shown in FIG. 9, at time $t_1$, the doped amount of fluorine in the central part does not reach the target amount $n_1$. On the other hand, as shown in FIG. 10, the doping of fluorine progresses fast in the outer peripheral part, and in the case where the concentration of the fluorine compound is higher than the final set-value concentration, the doped amount of fluorine exceeds the target amount $n_1$. After changing the concentration of the fluorine compound at time $t_1$, in the central part, the doped amount of fluorine continues to increase in both of the case shown by the broken line and the case shown by the solid line, reaching the target amount $n_1$ and being saturated at time $t_3$. Apparently, this seems to be because the fluorine doped in the outer peripheral part is removed and moves toward the central part.

On the other hand, in the outer peripheral part, both in the case of the solid line and in the case of the broken line, the fluorine having been doped so far is removed because of the decrease in the concentration of the fluorine compound gas after time $t_1$, and the doped amount of fluorine continues to decrease in the outer peripheral part of the soot glass deposit body. In the case of the broken line, the doped amount of fluorine reaches the target amount at time $t_4$, whereas in the case of the solid line the fluorine separates earlier than in the case of the broken line since the concentration of the fluorine compound is lower than the final set-value concentration, and the doped amount of fluorine becomes smaller than the target amount $n_1$ at time $t_2$. In the case of the solid line, the doped amount of fluorine increases again and reaches the target amount at time $t_3$ because the fluorine compound of the final set-value concentration is supplied to the container from time $t_2$.

In the conventional method (in the case of the dot-dash line in FIGS. 8 to 10), it is after the doped amount of the outer peripheral part reaches the target doped amount that the internal circumferential part reaches the target doped amount. Thus, fluorine is doped in the amount $n_1$ in the entire soot glass deposit body at time $t_5$. In the methods of the present invention which are the cases shown by the solid line or the broken line in FIGS. 8 to 10, the time needed for doping of fluorine can be reduced in either cases as compared with the case of the prior art. Particularly, if the supply of fluorine compound gas is stopped temporarily on the midway in the fluorine doping process, the time needed for uniformly doping the refractive index control substance to the entire soot glass deposit body can be reduced since the speed of removing the surplus refractive index control substance doped in the outer peripheral part of the soot glass deposit body can be improved.

When the concentration of the refractive index control substance to be supplied into the container is decreased to a level that is lower than the final set-value concentration, the lower the concentration, the more increased is the speed of the dissociation of the refractive index control substance which has been doped into the soot glass deposit body, and accordingly the time needed for doping the predetermined amount of refractive index control substance into the entire soot glass deposit body becomes shorter. Therefore, when lowering the concentration of the refractive index control substance, it is most preferable to control the concentration to zero, i.e. to stop the supply of the refractive index control substance. If the time in which the concentration of the refractive index control substance is decreased to a level lower than the final set-value concentration is too long, there is a possibility that the refractive index control substance may not be doped in the central part during such time. As a result of investigation by the present inventors, it was found that there would be no problem even if the supply of the refractive index control substance is stopped, provided that the time is equal to or less than half the time during which the refractive index control substance having the concentration that is higher than the final set-value concentration is supplied.

Figure 11:
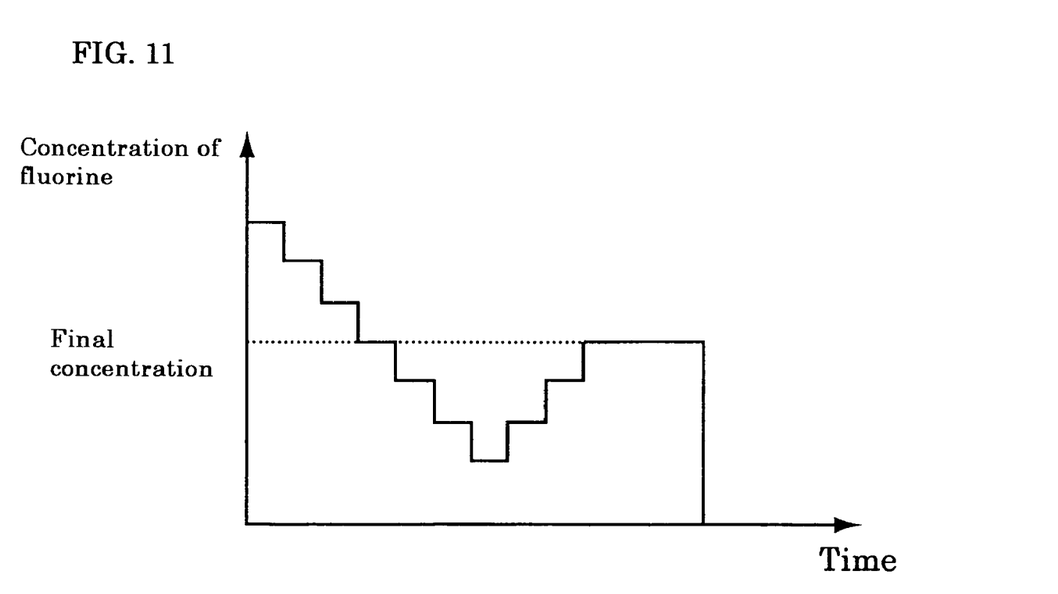
[FIG. 11] A figure showing one embodiment of changes in a set-value concentration of fluorine according to the present invention.
Figure 12:
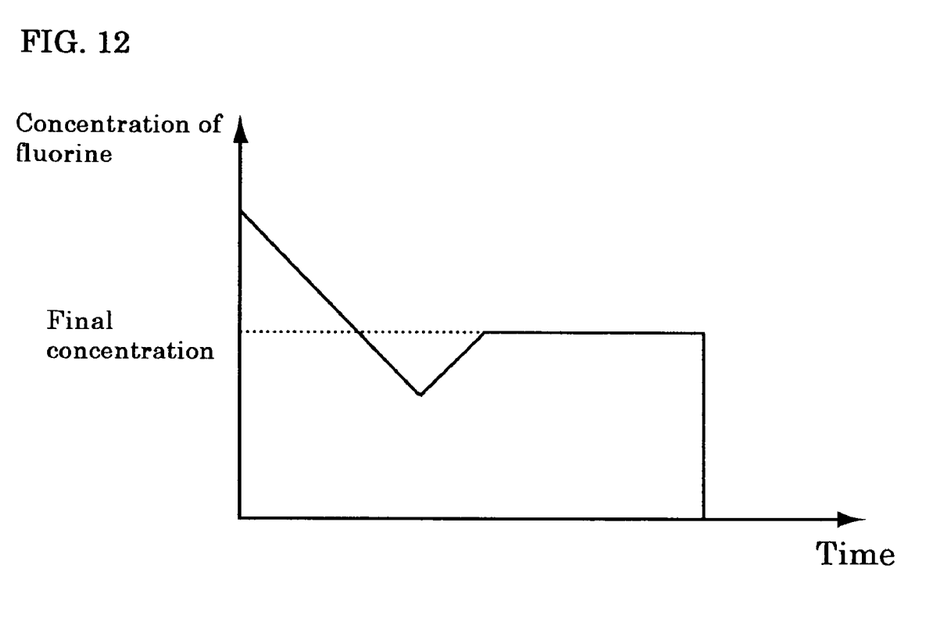
[FIG. 12] A figure showing one embodiment of changes in a set-value concentration of fluorine according to the present invention.
Figure 13:
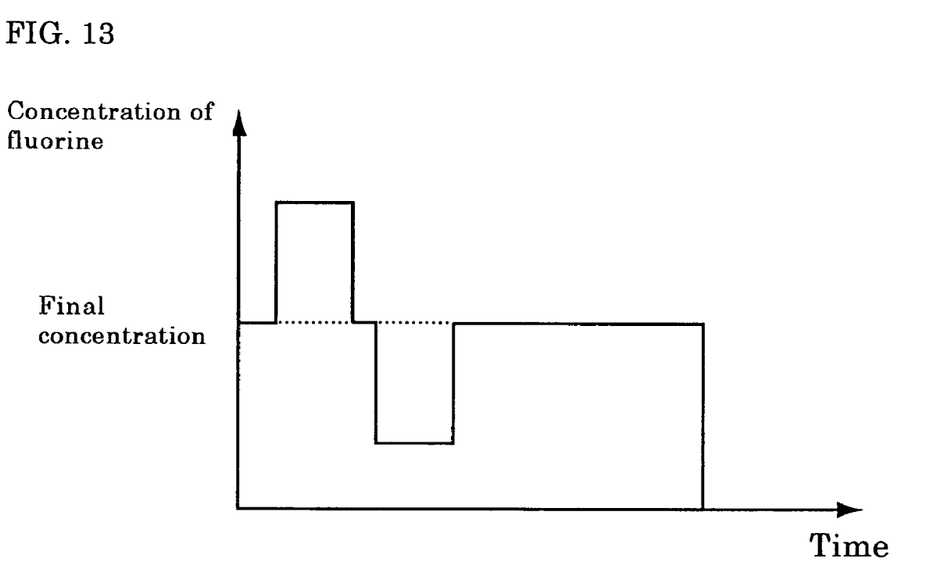
[FIG. 13] A figure showing one embodiment of changes in a set-value concentration of fluorine according to the present invention.

The set-value concentration of the refractive index control substance to be supplied into the container may be changed stepwise as shown in FIG. 11. Also, it may be changed continuously as shown in FIG. 12. In the present invention, as shown in FIG. 13, the concentration of the refractive index control substance may be made lower than the final set-value concentration after supplying the refractive index control substance of the final set-value concentration once.

Examples 3 to 8 and Comparative Examples 3 to 5

A soot glass deposit body is put in the furnace muffle tube of the heating unit, and the atmosphere in the furnace muffle tube is heated to a temperature of 1250° C. while a $Cl_2$ gas and He gas are flowed so as to perform dehydration. The atmospheric temperature in the furnace muffle tube is maintained at 1250° C., and the supply of $Cl_2$ gas is stopped, while a mixed gas of $SiF_4$ gas and He gas is supplied to the container so as to dope fluorine into the soot glass deposit body. After ending the doping of fluorine, the supply of He gas to the container is continued, while the atmospheric temperature in the furnace muffle tube is raised to 1450° C. At such temperature, heating is continued for 2 hours, and thus a transparent glass is produced. In several cases (Examples 3 to 8 and Comparative Examples 3 to 5) in which the concentration of the $SiF_4$ gas to be supplied into the container was changed when fluorine was doped into the soot glass deposit body, the time needed for doping the fluorine to the state of saturation at the final set-value concentration was sought.

In the following examples, it is aimed to make the relative refractive index difference of a transparent glass relative to the pure silica glass to be −0.37%. In this case, the final set-value concentration $c_1$ of $SiF_4$ becomes 7.4% by volume. The total flow rate of the doping gas is 10.8 slm. In order to maintain the total flow rate of 10.8 slm, the flow rate of the He gas is changed according to the change in which the flow rate of the $SiF_4$ gas is altered so as to change the concentration of the $SiF_4$ gas. The discharge amount from the discharge outlet is 10.8 slm.

Example 3

The size of the soot glass deposit body to be used was 200 mm in outer diameter and 1200 mm in length, and the average bulk density thereof was 0.3 g/cm$^3$. The inner diameter of the furnace muffle tube to be used was 240 mm. In the state where the concentration of the $SiF_4$ gas from time zero to time $t_1$ was set to $c_2$, and the concentration of the $SiF_4$ gas from time $t_1$ to $t_4$ was set to $c_1$ (=7.4% by volume), the minimum value of the fluorine doping time ($t_4$) and the minimum value in the supply of the $SiF_4$ gas were sought. The time $t_4$ is the time at which the necessary amount of fluorine is doped to the soot glass deposit body in order to obtain a transparent glass having the relative refractive index difference of −0.37% relative to the pure silica glass.

Figure 14:
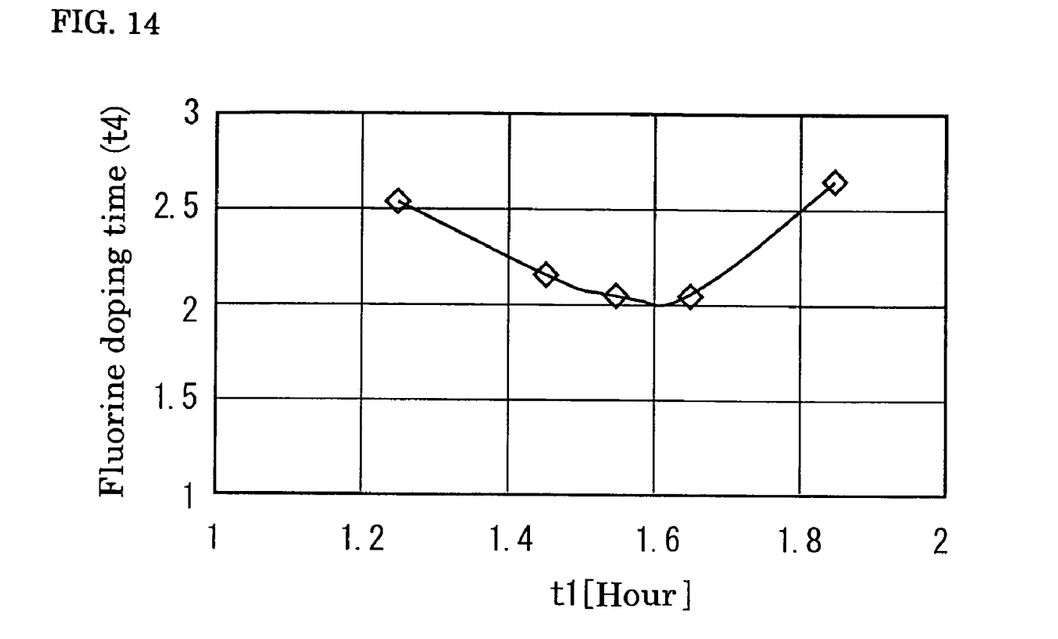
[FIG. 14] A figure showing the relationship between the fluorine doping time and the time in which a fluorine compound having a concentration higher than the final set-value concentration is supplied in the case where the initial concentration of the fluorine compound is 12% by volume in the present invention.
Figure 15:
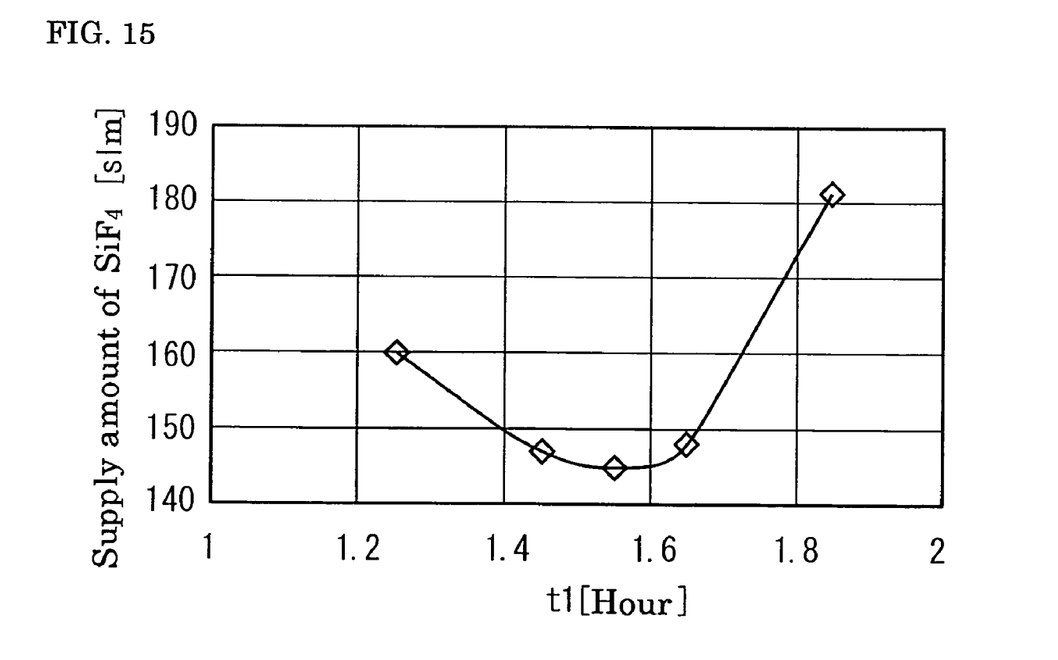
[FIG. 15] A figure showing the relationship between the supply amount of a fluorine compound gas and the time in which a fluorine compound having a concentration higher than the final set-value concentration is supplied in the case where the initial concentration of the fluorine compound is 12% by volume in the present invention.

As the preliminary experiment, with an initial concentration $c_2$ of the $SiF_4$ gas, $t_4$ is sought by changing $t_1$. The relationship between $t_1$ and $t_4$ in the case of $c_2$=12% by volume is shown in FIG. 14. Also, the amount of the $SiF_4$ gas supplied to the container from time zero to time $t_4$ is sought. The relationship between $t_1$ and the $SiF_4$ gas in the case of $c_2$=12% by volume is shown in FIG. 15. In the case of $C_2$=12% by volume, if $t_1$ is equal to 1.55 hours, the fluorine doping time ($t_4$) is 2.05 hours, and the supply amount of the $SiF_4$ gas is 144.9 liter, which are respectively the minimum values.

Next, by changing $c_2$ similarly, the relationship between $t_1$ and $t_4$ and the relationship between $t_1$ and the supply amount of the $SiF_4$ gas are sought. If $c_2$=24% by volume, with $t_1$ of 0.75 hours, $t_4$ is the minimum value of 1.45 hours, and with $t_1$ of 0.65 hours, the supply amount of the $SiF_4$ gas becomes the minimum value of 149.4 liters. If $c_2$=36% by volume, with $t_1$ of 0.6 hours, $t_4$ becomes the minimum value of 1.4 hours, and with $t_1$ of 0.5 hours, the supply amount of the $SiF_4$ gas becomes the smallest amount of 165.0 liters. If $c_2$=48% by volume, with $t_1$ of 0.4 hours, $t_4$ becomes the minimum value of 1.4 hours, and with $t_1$ of 0.3 hours, the fluorine doping time can be made the minimum value of 151.6 liters. Thus, it was found that the supply amount of the $SiF_4$ gas can be made the smallest value of 144.9 liters in the case of $c_2$=12% by volume, $t_1$ of 1.55 hours, and $t_4$ of 2.05 hours.

Example 4

Next, the minimum value of the fluorine doping time and the minimum value in the supply amount of $SiF_4$ gas was sought in the method in which the concentration of the fluorine compound gas is decreased on the midway of the fluorine doping process. The size and the average bulk density of the soot glass deposit body and the inner diameter of the furnace muffle tube are the same as in Example 3. The concentration of the $SiF_4$ gas from time zero to time $t_1$ is $c_2$, the concentration of the $SiF_4$ gas from time $t_1$ to time $t_2$ is $c_3$, and the concentration of the $SiF_4$ gas from time $t_2$ to time $t_3$ is $c_1$. The time $t_3$ is a time when fluorine is doped into the soot glass deposit body in an amount that is necessary for obtaining a transparent glass having the relative refractive index difference of −0.37% relative to the pure silica glass.

First, the $t_1$ dependence of fluorine doping time ($t_3$) and the supply amount of the $SiF_4$ gas is sought while the concentration $c_3$ and the maintenance time ($t_2$-$t_1$) are fixed at certain values, as in Example 3, and the initial concentration $c_2$ is set at a certain concentration. If $c_2$ and $c_3$ are set to be 12% and 0% by volume, respectively, and if $t_2$-$t_1$ is 0.2 hours, the minimum value of the fluorine doping time is 2.25 hours, and the minimum value of the supply amount of the $SiF_4$ gas becomes 150.9 liters when $t_1$ is 1.75 hours. Next, if $c_2$ is changed while $c_3$ and $t_2$-$t_1$ are set to the above-mentioned fixed values, the fluorine doping time can be made the minimum value of 0.9 hours when $c_2$ is 48% by volume, $t_1$ is 0.5 hours, $c_3$ is 0% by volume (that is, the supply of $SiF_4$ gas is stopped), and $t_2$ is 0.7 hours. Thus, it was found that the fluorine doping time could be made the minimum of 147.0 liters in the case where $c_2$ was 24% by volume, $t_1$ was 0.85 hours, $c_3$ was 0% by volume (that is, the supply of $SiF_4$ gas was stopped), $t_2$ was 1.05 hours, and $t_3$ was 1.35 hours.

Comparative Example 3

In the method in which the concentration of the fluorine compound gas is maintained 7.4% by volume constantly from the beginning of supply of the fluorine compound gas, the time during which fluorine is doped in an amount that is necessary for obtaining a transparent glass having the relative refractive index difference of −0.37% relative to the pure silica glass and the amount of $SiF_4$ gas supplied during the time were sought. The size and the average bulk density of the soot glass deposit body and the inner diameter of the furnace muffle tube are the same as in Example 3. It was found that the necessary fluorine doping time was 3.2 hours and that the supply amount of the $SiF_4$ gas was 153.6 liters.

It was found that according to Examples 3 and 4 and Comparative Example 3 the time needed for doping fluorine into the soot glass deposit body having a large diameter could be decreased as compared with the conventional method. Particularly, for decreasing the time needed for doping fluorine into the soot glass deposit body having a large diameter, it was more effective to change the concentration of the fluorine compound gas on the midway of the fluorine doping process so as to be lower than the final set-value concentration.

Example 5

In the case where the soot glass deposit body had an outer diameter of 250 mm and a length of 1300 mm and an average bulk density of 0.3 g/cm³ and the inner diameter of the furnace muffle tube was 280 mm, the minimum value of the fluorine doping time and the minimum value of supply amount of the $SiF_4$ gas were sought in the same manner as in Example 3. It was found that when $c_2$ was 36% by volume and $t_1$ was 0.85 hours, the fluorine doping time could be the shortest time of 1.65 hours, and that the supply amount of the $SiF_4$ gas could be made the smallest amount of 219.0 liters when $c_2$ was 12% by volume, $t_1$ was 2.5 hours, and $t_4$ was 3 hours.

Example 6

In the method in which the concentration of the fluorine compound gas was made lower than the final set-value concentration on the midway of the fluorine doping process, the minimum value of the fluorine doping time and the minimum value of the supply amount of the $SiF_4$ gas were sought in the same manner as in Example 4 under the conditions where the size and the average bulk density of the soot glass deposit body and the inner diameter of the furnace muffle tube were the same as in Example 5. It was found that the fluorine doping time could be made the shortest time of 1.35 hours when $c_2$ was 48% by volume, $t_1$ was 0.75 hours, $c_3$ was 0% by volume (that is, the supply of the $SiF_4$ gas was stopped), and $t_2$ was 1.05 hours, and that the supply amount of the $SiF_4$ gas could be made the smallest amount of 217.2 liters when $c_2$ was 24% by volume, $t_1$ was 1.3 hours, $c_3$ was 0% by volume (that is, the supply of $SiF_4$ gas was stopped), $t_2$ was 1.5 hours, and $t_3$ was 1.8 hours.

(Comparative Example 4) In the method in which the concentration of the fluorine compound gas was maintained 7.4% by volume constantly from the beginning of supply of the fluorine compound gas under the conditions where the size and the average bulk density of the soot glass deposit body and the inner diameter of the furnace muffle tube were the same as in Example 5, the time during which fluorine was doped in an amount that was necessary for obtaining a transparent glass having the relative refractive index difference of −0.37% relative to the pure silica glass and the amount of $SiF_4$ gas supplied during the time were sought. It was found that the necessary fluorine doping time was 5.2 hours and that the supply amount of the $SiF_4$ gas was 249.6 liters. In this case, also the fluorine doping time could be decreased.

Example 7

In the case where the soot glass deposit body had an outer diameter of 300 mm and a length of 1100 mm and an average bulk density of 0.3 g/cm³ and the inner diameter of the furnace muffle tube was 330 mm, the minimum value of the fluorine doping time and the minimum value of supply amount of the $SiF_4$ gas were sought in the same manner as in Example 3. It was found that when $c_2$ was 36% by volume and $t_1$ was 1.2 hours, the fluorine doping time could be the shortest time of 2.3 hours, and that the supply amount of the $SiF_4$ gas could be made the smallest amount of 318.3 liters when $c_2$ was 12% by volume, $t_1$ was 3.65 hours, and $t_4$ was 4.35 hours.

Example 8

In the method in which the concentration of the fluorine compound gas was made lower than the final set-value concentration on the midway of the fluorine doping process, the minimum value of the fluorine doping time and the minimum value of the supply amount of the $SiF_4$ gas were sought in the same manner as in Example 7 under the conditions where the size and the average bulk density of the soot glass deposit body and the inner diameter of the furnace muffle tube were the same as in Example 7. It was found that the fluorine doping time could be made the shortest time of 2.0 hours when $c_2$ was 48% by volume, $t_1$ was 1.0 hours, $c_3$ was 0% by volume (that is, the supply of the $SiF_4$ gas was stopped), and $t_2$ was 1.3 hours, and that the supply amount of the $SiF_4$ gas could be made the smallest amount of 312.6 liters when $c_2$ was 24% by volume, $t_1$ was 1.85 hours, $c_3$ was 0% by volume (that is, the supply of $SiF_4$ gas was stopped), $t_2$ was 2.15 hours, and $t_3$ was 2.65 hours.

Comparative Example 5

In the method in which the concentration of the fluorine compound gas was maintained 7.4% by volume constantly from the beginning of supply of the fluorine compound gas under the conditions where the size and the average bulk density of the soot glass deposit body and the inner diameter of the furnace muffle tube were the same as in Example 7, the time during which fluorine was doped in an amount that was necessary for obtaining a transparent glass having the relative refractive index difference of −0.37% relative to the pure silica glass and the amount of $SiF_4$ gas supplied during the time were sought. It was found that the necessary fluorine doping time was 7.9 hours and that the supply amount of the $SiF_4$ gas was 379.2 liters. In this case, also the fluorine doping time could be decreased.

The disclosure of Japanese patent application 2004-335334 (the application made on Nov. 29, 2004) including the specification, the claims, the drawings, and abstract is incorporated herein in its entirety by reference.

INDUSTRIAL APPLICABILITY

The glass manufactured according to a manufacturing method of the present invention has a superior uniformity in the refractive index. Therefore, the present invention can be used for providing glass of superior quality in various industrial fields such as a glass preform for an optical fiber and a glass preform for a photomask, etc.

EXPLANATION OF REFERENCES

1 . . . soot glass deposit body, 2 . . . dummy rod, 10 . . . heating unit, 11 . . . furnace muffle tube, 12 . . . outer wall, 13 . . . heat source, 14 . . . supply inlet, 15 . . . supply pipe, 16 . . . discharge outlet, 17 . . . discharge pipe, 18 . . . lid, 20 . . . lift, 21 . . . radiation thermometer

The invention claimed is:

1. A method of making a glass, the method comprising the steps of:
   (1) determining a final set-value concentration of a refractive index control substance depending on a target refractive index of the glass;
   (2) putting a soot glass deposit body having an effective portion in a container;
   (3) doping the refractive index control substance into the soot glass deposit body by supplying a doping gas into the container and discharging the gas from the container, wherein the doping gas contains the refractive index control substance; and
   (4) consolidating the soot glass deposit body by heating,
   wherein in the process of doping the refractive index control substance, the container is first supplied with the doping gas including the refractive index control substance having a concentration set to be higher than the final set-value concentration, then supplied with the doping gas including the refractive index control substance having a set-value concentration lower than the final set-value concentration or the gas including none of the refractive index control substance and finally, supplied with the doping gas including the refractive index control substance having the final set-value concentration into the container such that the refractive index control substance is doped into the soot glass deposit body, and
   wherein the refractive index control substance gas is flowed at a flow rate f satisfying an equation: f/V <0.012 (minute$^{-1}$), in which f (slm) represents a flow rate of the refractive index control substance gas and V (liter) represents a volume obtained by subtracting the volume of the effective portion of the soot glass deposit body from a capacity of the container corresponding to a part surrounding the effective portion of the soot glass deposit body.

2. A method of making a glass according to claim 1, wherein during the step of doping the refractive index control substance, the temperature of the soot glass deposit body is maintained at a constant temperature.

3. A method of making a glass according to claim 1, wherein in the process of doping the refractive index control substance, an increment in the average bulk density of the soot glass deposit body is maintained equal to or less than 0.2 g/cm$^3$ during supplying of the gas including the refractive index control substance having a set-value concentration of the refractive index control substance higher than the final set-value concentration.

4. A method of making a glass according to claim 1, wherein in the process of doping the refractive index control substance, a gas including none of the refractive index control substance is supplied into the container after supplying of the doping gas including the refractive index control substance having the set-value concentration higher than the final set-value concentration into the container and prior to supplying of the doping gas including the refractive index control substance having the final set-value concentration into the container.

* * * * *